July 7, 1970     L. C. YOUNG     3,519,058
MOLDING METHOD
Filed May 3, 1968     12 Sheets-Sheet 1
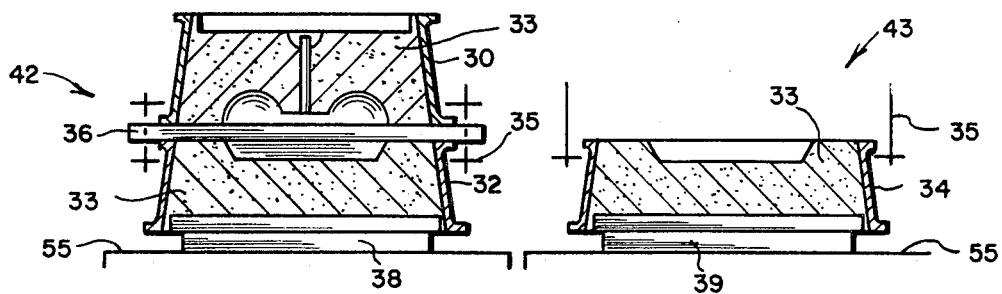
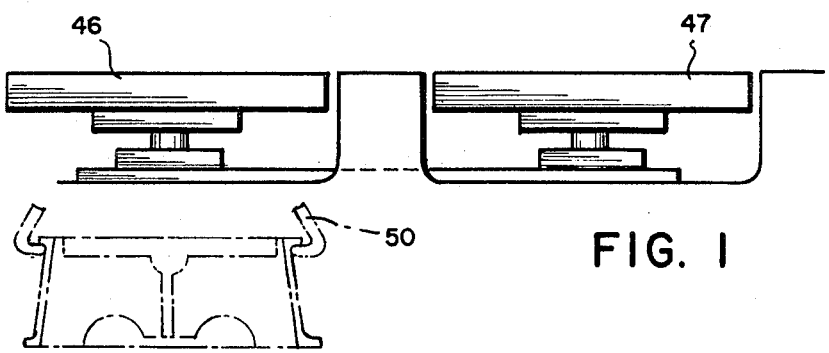
FIG. 1
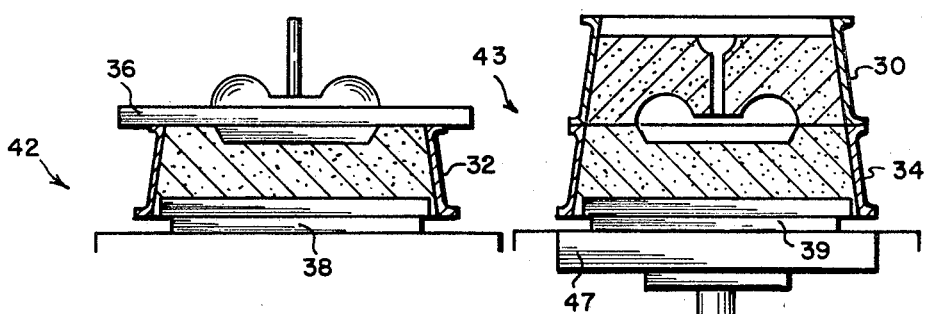
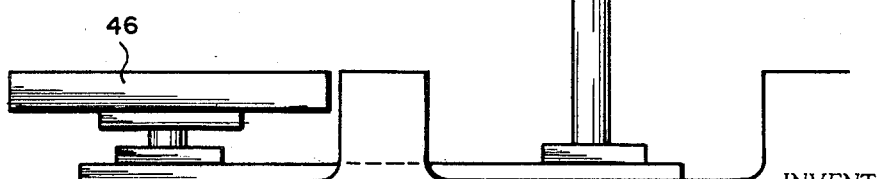
FIG. 2
INVENTOR.
LESTER C. YOUNG
BY
Woodling Krost Granger+Krost
attys July 7, 1970 L. C. YOUNG 3,519,058
MOLDING METHOD
Filed May 3, 1968 12 Sheets-Sheet 2
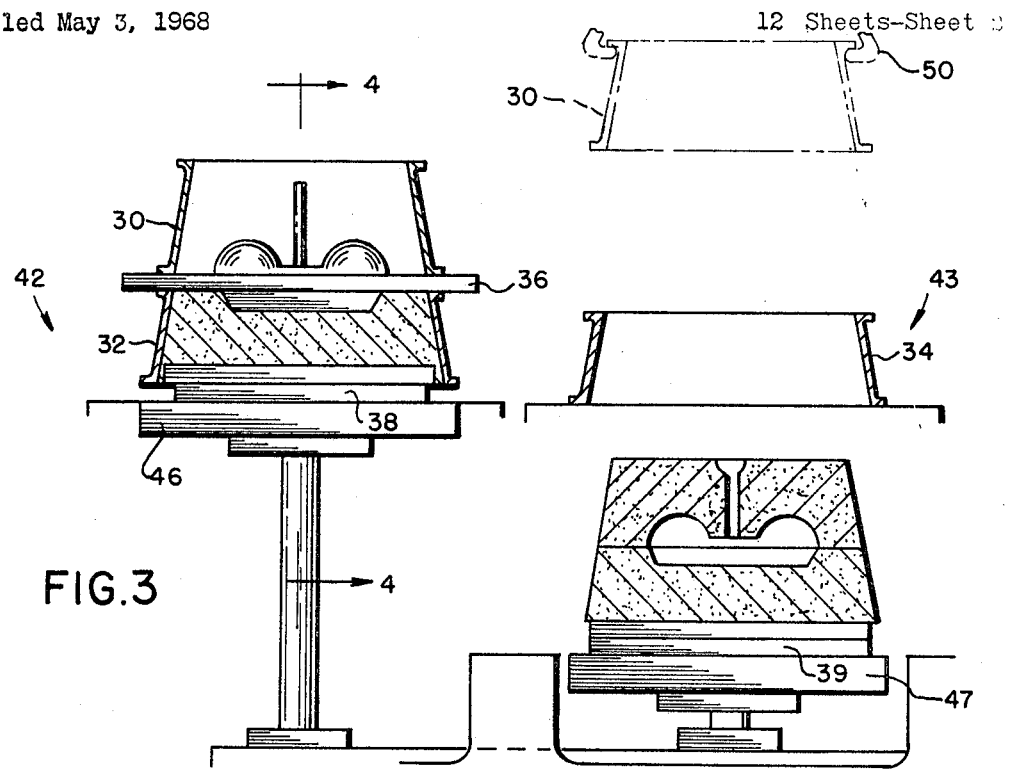
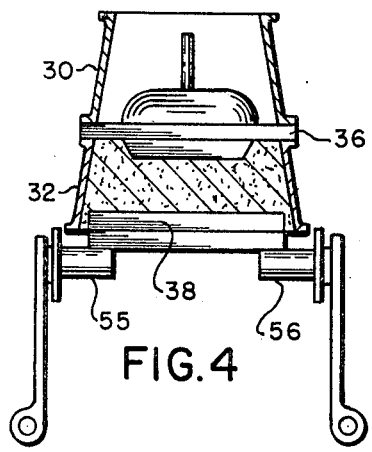
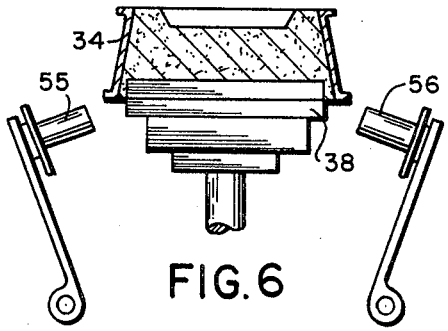
INVENTOR.
LESTER C. YOUNG
BY
Woodling Krost Granger + Rust
attys July 7, 1970  L. C. YOUNG  3,519,058
MOLDING METHOD Filed May 3, 1968  12 Sheets-Sheet 3

INVENTOR.
LESTER C. YOUNG
BY
Woodling, Krost, Granger & Rust
Attys

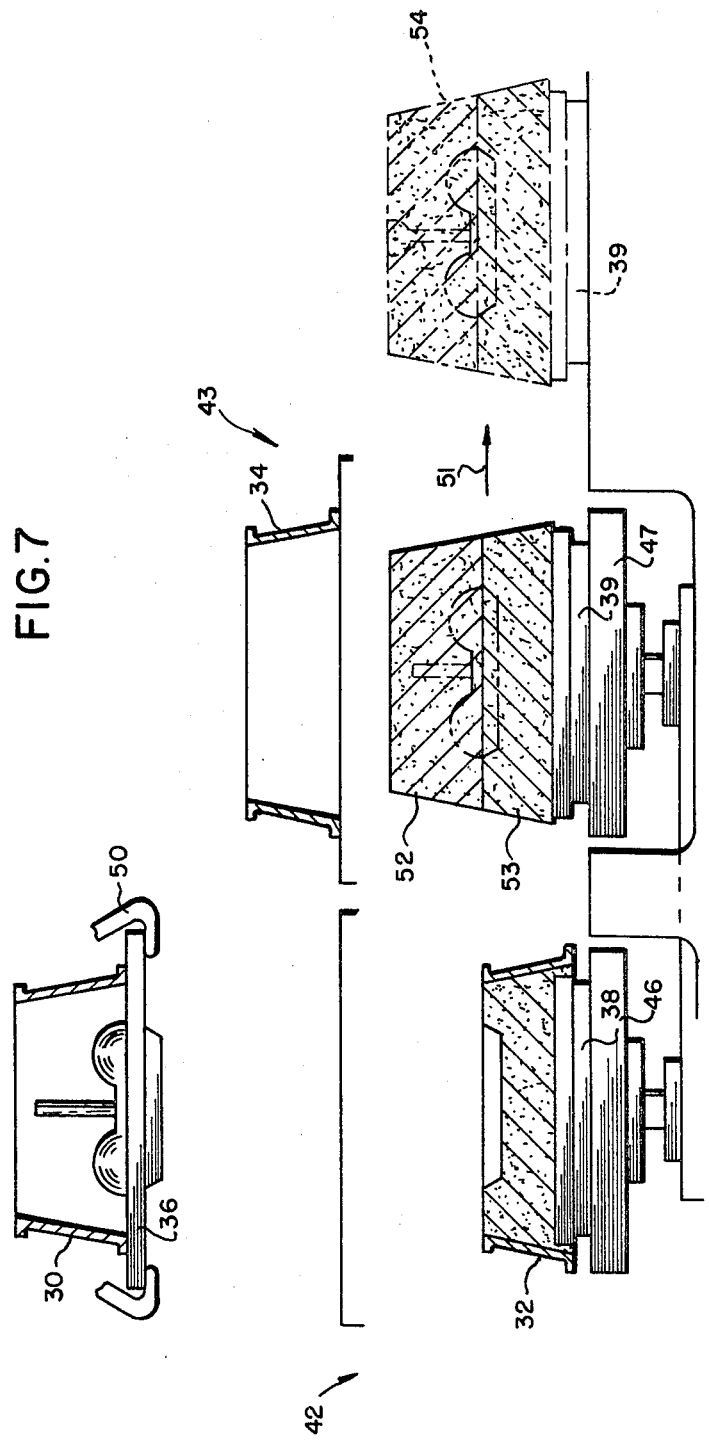

July 7, 1970     L. C. YOUNG     3,519,058
MOLDING METHOD
Filed May 3, 1968     12 Sheets-Sheet 5
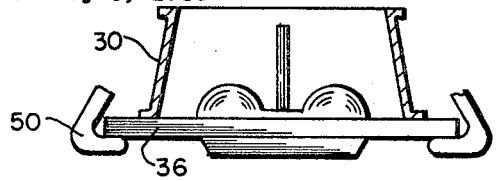
FIG. 8
 
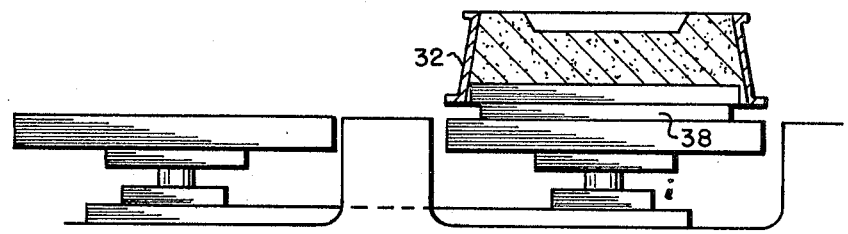
FIG. 9
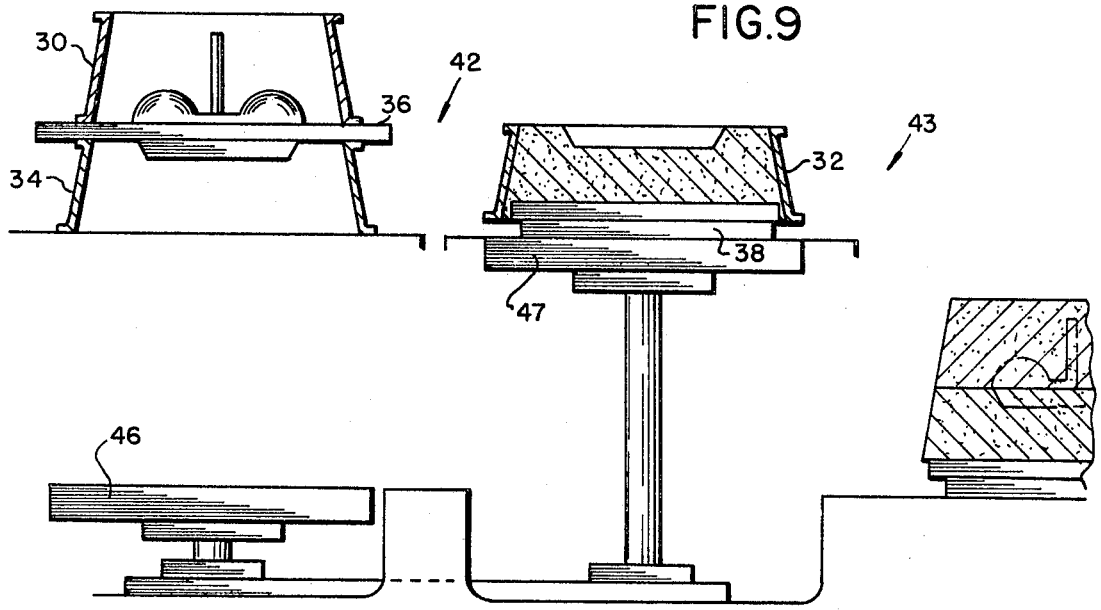
INVENTOR.
LESTER C. YOUNG
BY
Woodling Krost Grangert Krost
Attys July 7, 1970  L.C. YOUNG  3,519,058
MOLDING METHOD
Filed May 3, 1968  12 Sheets-Sheet 6

INVENTOR.
LESTER C. YOUNG
BY
Woodling, Krost, Granger+Krost
Attys.

July 7, 1970  L. C. YOUNG  3,519,058
MOLDING METHOD

Filed May 3, 1968  12 Sheets-Sheet 7

INVENTOR.
LESTER C. YOUNG
BY
Woodling Krost Granger Rust
Attys.

July 7, 1970 L. C. YOUNG 3,519,058
MOLDING METHOD
Filed May 3, 1968 12 Sheets-Sheet 8
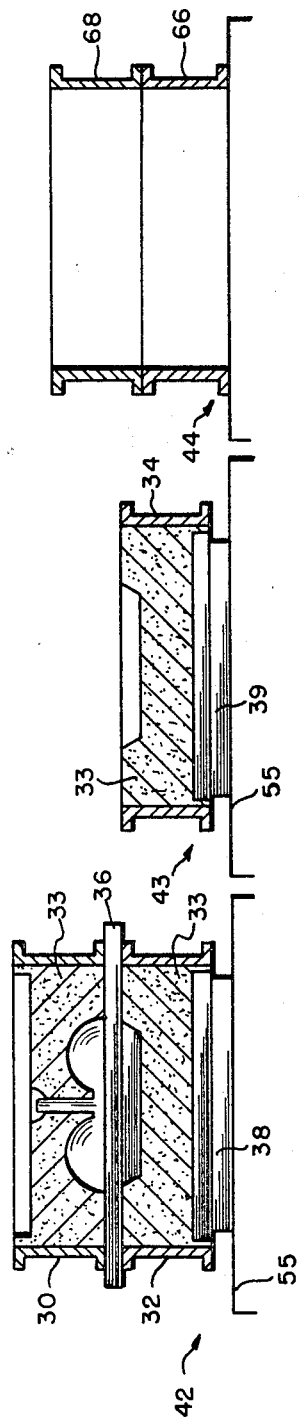
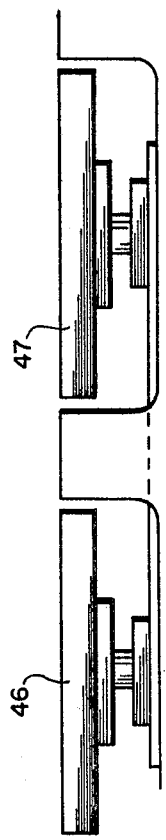
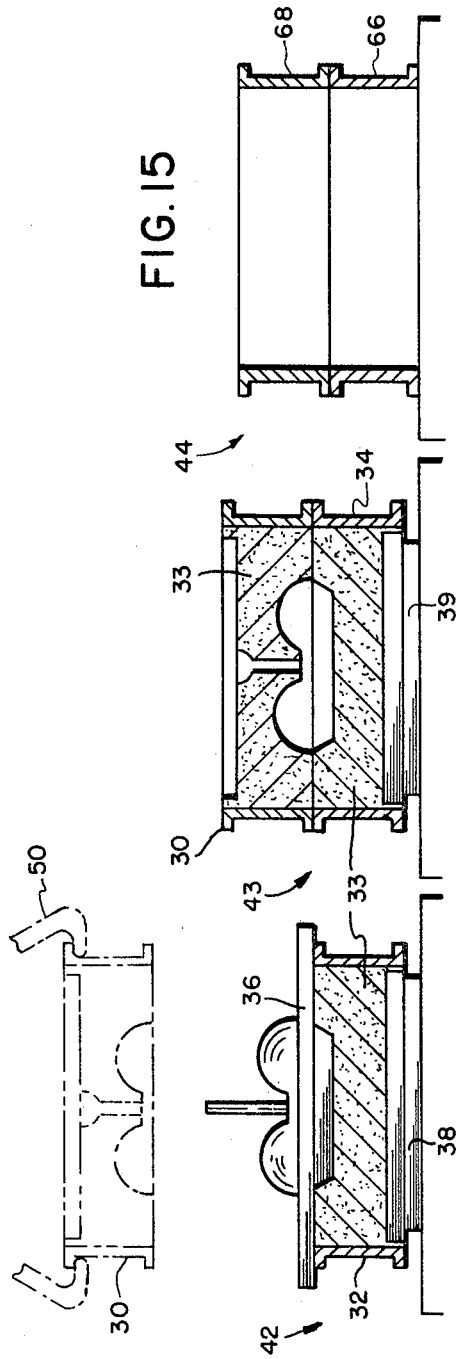
INVENTOR.
LESTER C. YOUNG
BY
Woodling Krost Granger Rust
Attys.

July 7, 1970

L. C. YOUNG 3,519,058

MOLDING METHOD

Filed May 3, 1968

INVENTOR.
LESTER C. YOUNG
BY
Woodling Krost Granger Rust
Attys.

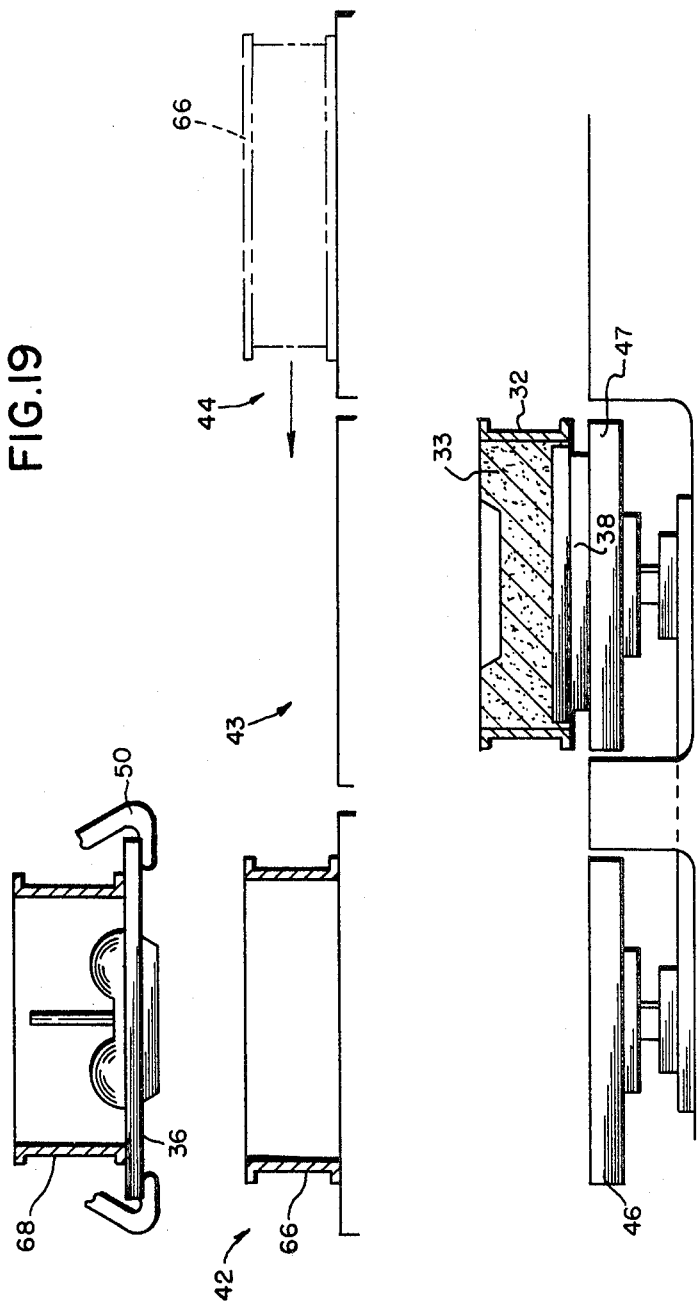

United States Patent Office 3,519,058
Patented July 7, 1970

3,519,058
MOLDING METHOD
Lester C. Young, Cleveland, Ohio, assignor to SPO, Incorporated, a corporation of Ohio
Filed May 3, 1968, Ser. No. 726,480
Int. Cl. B22c 17/10, 15/02; B22d 33/04
U.S. Cl. 164—40                                    5 Claims

ABSTRACT OF THE DISCLOSURE

A molding method for more economically making foundry molds which includes the use of at least two drag flasks and one cope flask (when removable flasks are utilized) along with a matchplate and the moving of these elements relative to each other to accomplish the desired end result.

---

The prior art has utilized the same basic apparatus in producing finished molds for the foundry industry, however, the disadvantages which have been inherent in prior art methods involve the individual and separate handling of the cope and drag flasks along with the matchplate in such a manner that extremely large inefficiencies result in both time, effort and machinery costs. The present invention has as its essential element the method of utilizing two drag flasks in combination with a matchplate and a single cope flask particularly when the cope and drag flasks are provided with sand locks so that the finished mold can be completely released therefrom and in the second embodiment of the invention tight flasks are utilized. The invention when using tight flasks involves three drag flasks and two cope flasks to complete one cycle of operation. These advantages will be more fully and completely understood from a complete review and understanding of the following drawings and description.

FIGS. 1 through 9 illustrate the manipulative steps that are gone through in arranging the two drag flasks, matchplate and the single cope flask with respect to each other to accomplish the advantages of the present invention when removable flasks are used.

FIGS. 10 through 13 show the normal molding operations for filling the assembled cope and drag flask with sand and applying pressure to the sand so that it is compressed and will not readily flow from its compressed state; and FIGS. 14 through 19 illustrate the steps involved which are similar to those shown in FIGS. 1 through 8 but when tight cope and drag flasks are utilized.

Figure 6A:
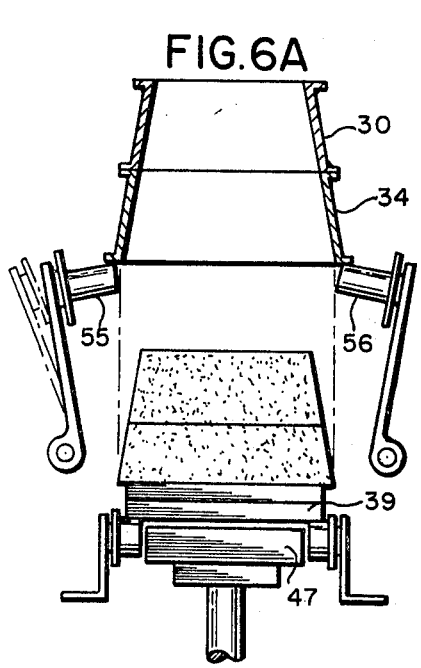
Figure 6B:
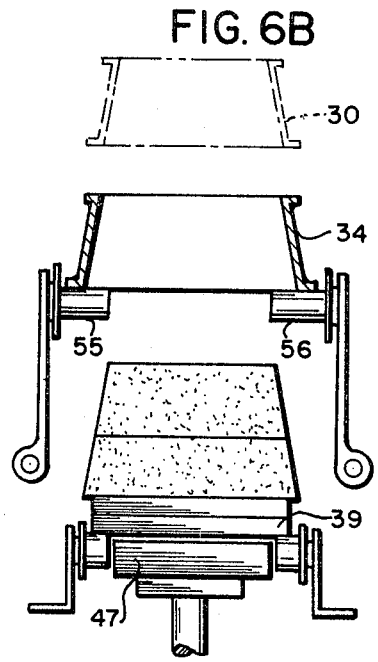

In accordance with the teachings of the present invention, FIG. 1 shows an assembled cope flask 30 located in position upon a first drag flask 32 with a matchplate 36 located therebetween and this position which will be generally alluded to as a first position 42. The cope flask 30 and drag flask 32 are filled with compressed sand 33. The drag flask 32 is provided with the conventional bottom board 38 underneath the same to provide proper support for the sand which is carried therein. A first elevator 46 is located below the first position 42 and the vertical level of the assembled cope and drag flask is maintained by means of first and second roller mechanisms 55 and 56 which are best observed in FIGS. 4, 6, 6A and 6B. FIG. 4 shows the roller mechanisms in their active position whereat they are located beneath the edges of the bottom board to restrain the assembled flasks from vertical movement and FIG. 6 shows the roller mechanisms in inactive position whereat the elevator 46 may be brought into active working position. This same construction is utilized throughout.

Located at a second position 43, which is adjacent position 42, is provided a second drag flask 34 which contains compressed sand 33 and is located on a second bottom board 39. Located beneath the second drag flask 34 is a second elevator 47. The same type roller mechanisms 55 and 56 are utilized. With the recited elements located in the positions of FIG. 1, the first step that is involved in the method of the present invention is the vertical lifting of the cope flask 30 from its position (FIG. 1) on the drag flask 32 and matchplate 36 by means of a lifting transfer mechanism 50 and placing the same in position on top of the second drag flask 34 as shown in FIG. 2. The elevator 47 is moved to a vertical position to elevate slightly and support the bottom board 39 as seen in FIG. 2. Roller mechanisms 55 and 56 supporting flask 34 are then moved from the position of FIG. 4 to an intermediate position of FIG. 6A. The sand locks on the cope flask 30 and drag flask 34 are released and the construction of the sand locks (not shown) will be readily appreciated by those skilled in the art since they are of a conventional construction which is simply to slightly release the flasks from about the molds which are formed therein so the molds can be removed. Flask mating guide pins and bushings of various conventional construction are used but also are not illustrated except schematically in FIG. 1 by the lines 35.

FIGS. 3 and 6A show the next step which involves lowering of the second elevator 47 which supports the completed mold and by the force of gravity is removed from the cope flask 30 and drag flask 34. The roller mechanisms 55 and 56 in position 6A just support the empty flasks 30 and 36 and once the completed mold is lowered, 55 and 56 are moved to the position of 6B. The empty cope flask 30 is retransferred by the lifting transfer mechanism 50 to a position over the first drag flask 32 and is lowered into position on the matchplate 36. In the position of FIG. 3 the elevator 46 is raised into position in engagement with the bottom board 38. When the elevator has been so raised the roller mechanisms 55 and 56 which support flask 32 are moved from their active position shown in FIG. 4 to their inactive position shown in FIG. 6.

Figure 5:
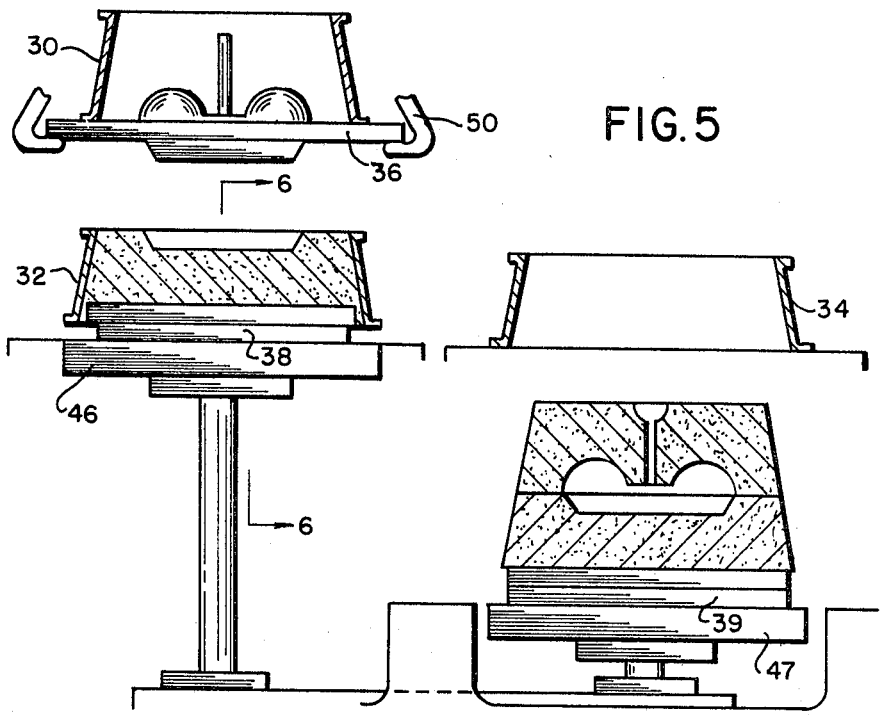

FIG. 5 shows the next step which involves the raising of the cope flask 30 and the matchplate 36 as a unit vertically from their first position 42 in engagement with the first drag flask 32 and the elements 55 and 56 at the second position 43 are in the position of FIG. 6B.

FIG. 7 show the next step which involves essentially the lowering of the elevator 46 to the position shown and the completed mold at position 43 is moved out of the system in the direction of arrow 51 to the dotted line position 54 by suitable means either mechanically or manually and may then be transferred to a completed mold storage or to the pouring room as desired.

FIGS. 8 and 6B demonstrate the next sequence of steps which includes the lateral movement of the second drag flask 34 from the second position 43 laterally to the first position 42 vertically beneath the raised cope flask 30 and matchplate 36. At the same time the first drag flask 32 is moved laterally from the lowered elevator 46 below the first position 42 to the lowered elevator 47 below the second position 43 and elements 55 and 56 open to the inactive position of FIG. 6.

In FIG. 9 the assembled cope flask 30 and matchplate 36 are lowered into position over the second drag flask 34 and the second elevator 47 moves the first drag flask 32 up to the level of the roller mechanisms 55 and 56 in the position of FIG. 6 which then move to the active position of FIG. 4.

Figure 10:
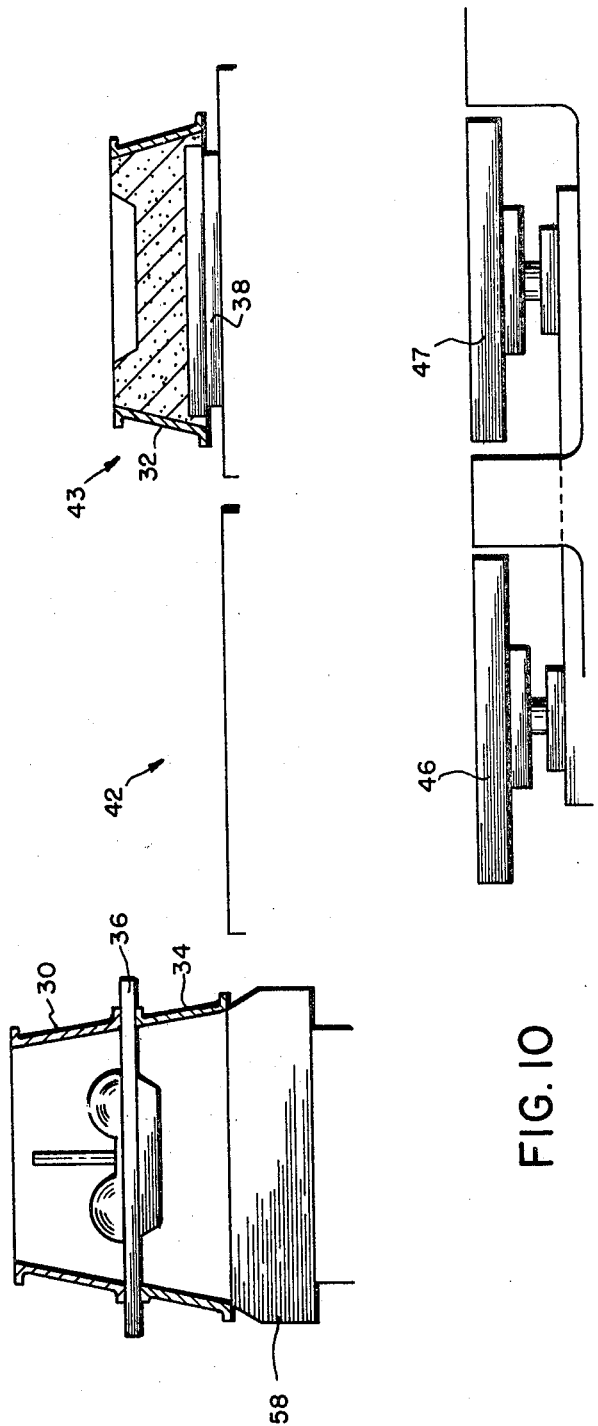
Figure 11:
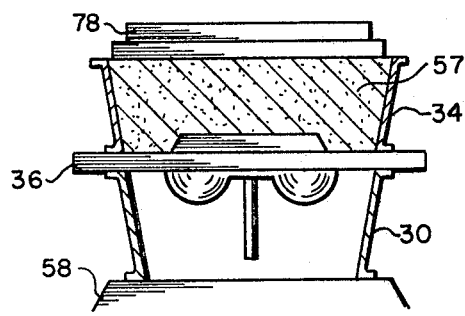
Figure 12:
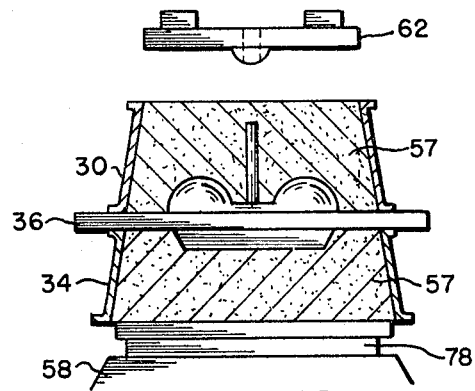
Figure 13:
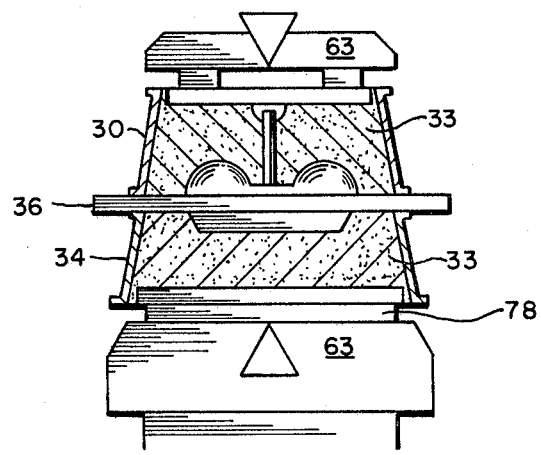
Figure 16:
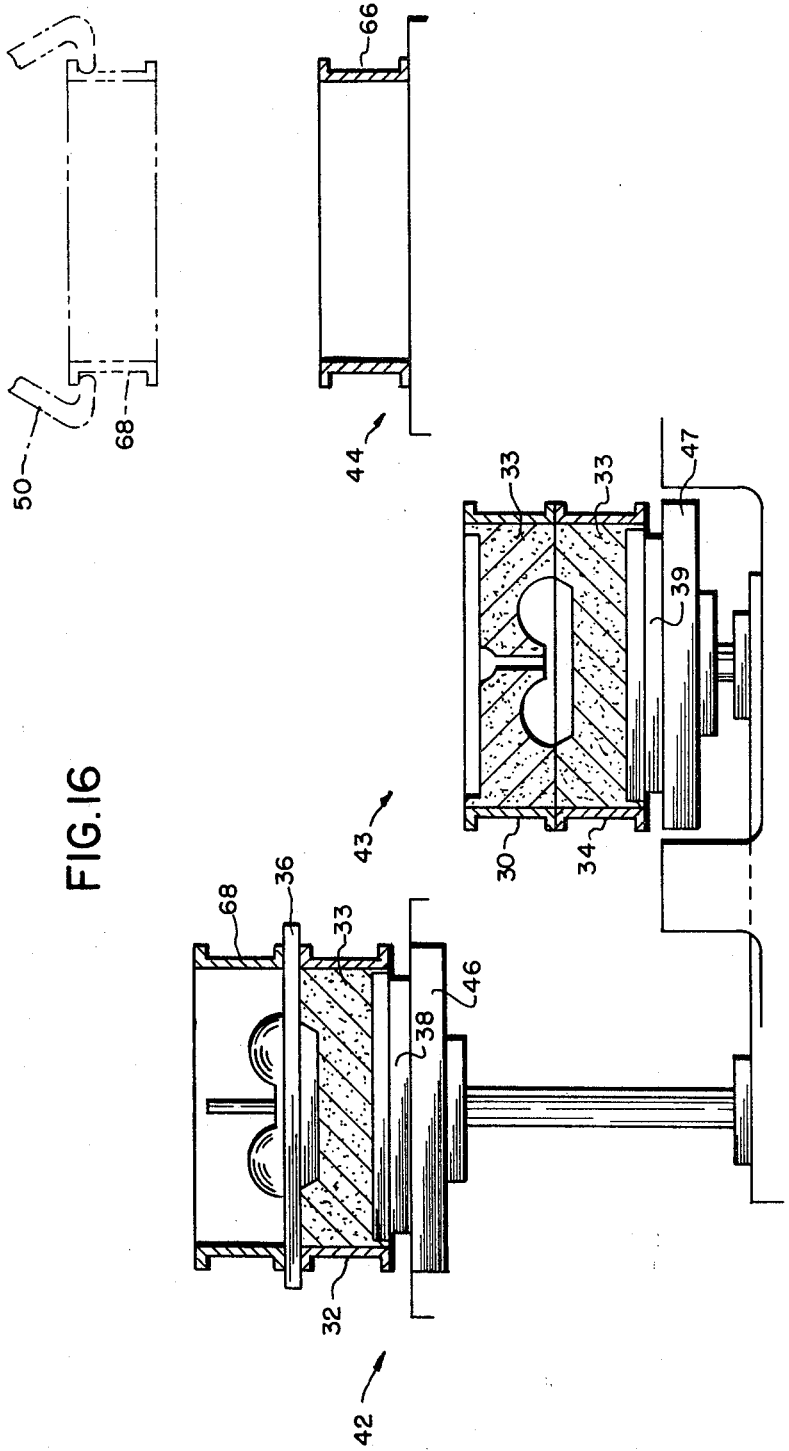
Figure 17:
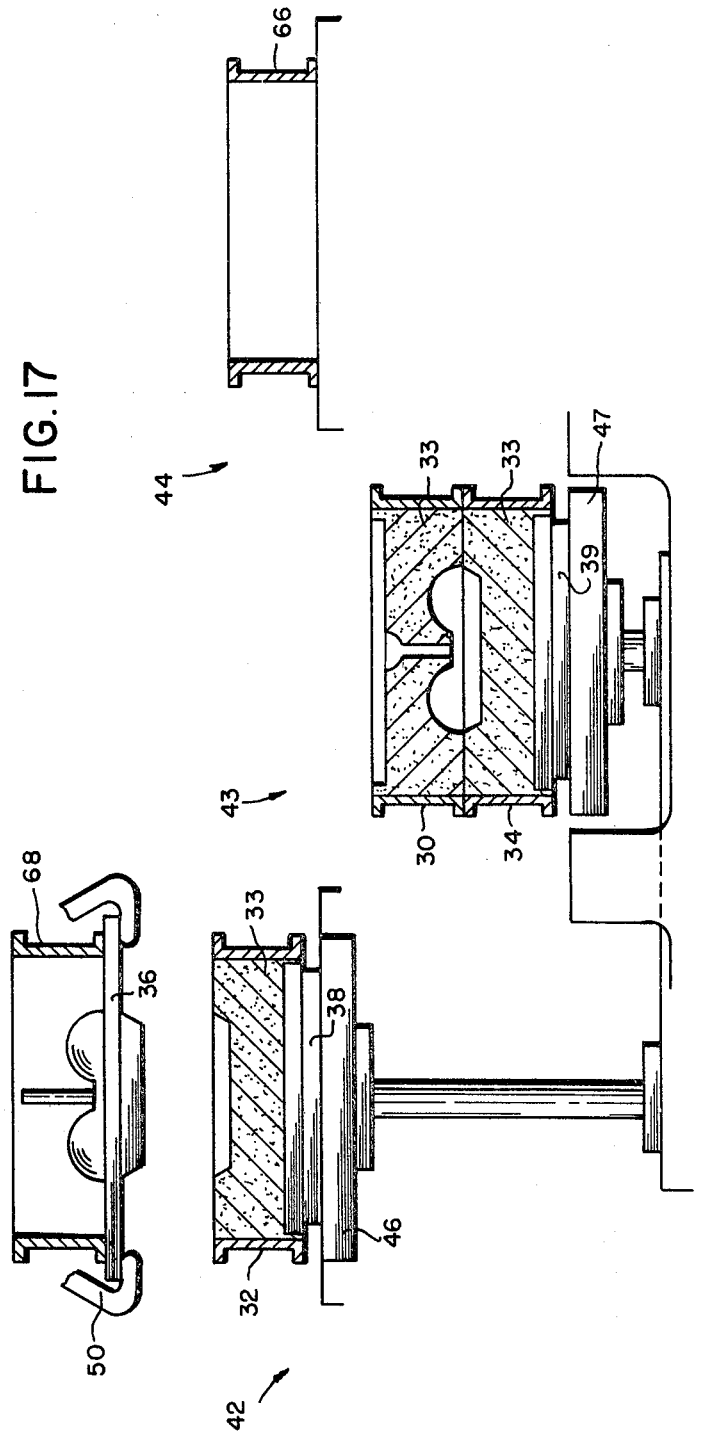
Figure 18:
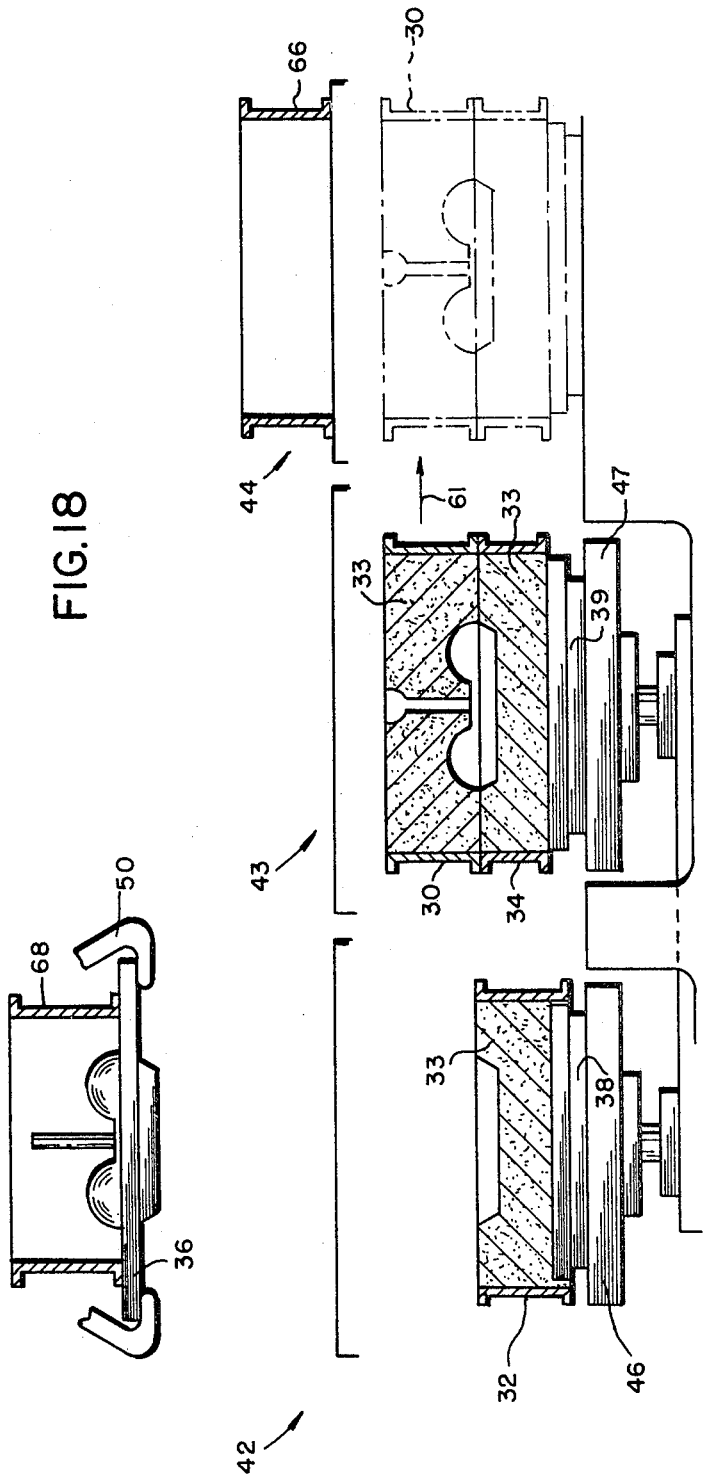

FIG. 10 shows the next step which involves the lowering of the second elevator 47 and the lateral transfer of the assembled cope flask 30, matchplate 36 and second drag flask 34 from the first position 42 to a molding area which includes as shown, a support member 58 which may be part of a squeeze mechanism 63. From the position of FIG. 10 the assembled cope flask 30 and drag flask 34 are rolled 180° to assume the position of FIG. 11, whereat the drag flask is filled with loose sand 57 and a bottom board 78 like 38 is moved into position. This assembly is then rolled another 180° to assume the position of FIG. 12 and the cope flask 30 is then filled with loose sand 57 and a cope squeeze board 62 is moved into position. This assembly is then transferred to a squeeze mechanism 63 (which may include the support member 58) which serves to compress and squeeze the sand to the desired degree. This assembly then is moved to assume the condition shown in FIG. 1 and the position indicated at 42. The first drag flask 32 in the position of FIG. 10 already assumes the position of FIG. 1 which is the second position 43. The first drag flask 32 in the position of FIG. 10 may have cores set therein if they are desired or required.

It will therefore be apparent that the molding sequence is ready to be repeated and the only difference in the starting position in the second cycle is that the drag flasks have reversed their positions with regard to position 42 and 43 in the first cycle. When these drag flask elements have next completed the molding circuit, they will have reassumed the positions they occupied originally in FIG. 1.

FIGS. 14 through 19 generally correspond to FIGS. 1 through 3, 5, 7 and 8, respectively, however, these figures demonstrate the application of the principles of the present invention to the procedure involved when tight molds are utilized in the molding procedure. As described hereinabove, the essential difference is that when tight flasks are utilized, the tight flasks remain with the completed mold and go completely through the pouring step and are not separated from the mold until after the mold is shaken out. In describing this particular sequence of operatons there are provided the same elements in the same position as described in FIG. 1. The elements, except that tight flasks are used, will be identified by the same reference numerals. In addition, however, there is provided at a third position 44 a third drag flask 66 and a seoond cope flask 68. FIG. 15 shows the flasks 66 and 68 occupying the same position and the cope flask 30 is placed on drag flask 34 as in FIG. 2. When the cope flask 30 and the second drag flask 34 are lowered by means of the second elevator 47 (FIG. 16), the flasks and mold therein are lowered therewith. The liftiing transfer mechanism 50 then attaches to the second cope flask 68 at the third position 44 and transfers the second cope flask 68 into position upon the first drag flask 32. This leaves the third drag flask 66 at the third position 44 and this drag flask may either remain at the third position 44 or it may be pushed over to the second position 43. In any event, in FIG. 17 the matchplate 36 and the cope flask 68 are raised vertically by the lifting transfer mechanism 50 and at FIG. 18 the first drag flask 32 is lowered vertically by elevator 46 and the completed mold with the cope flask 30 and second drag flask 34 therearound is moved laterally out of the system in the direction of arrow 61 and it may from there be transferred to the pouring room or to a completed mold storage. FIG. 19 shows the transfer of the third drag flask 66 laterally to a position beneath the second cope flask 68 and matchplate 36 and the first drag flask 32 is mover laterally to the right from its position on elevator 46 to elevator 47 beneath the second position 43. The steps involved after FIG. 19 are the same as those referred to in FIGS. 9 through 13 and the assembly is then moved back to the position of FIG. 14 where the sequence is repeated with a new second cope flask and third drag flask.

It will therefore become readily apparent to those skilled in the art that an extremely advantageous method of making foundry molds has been disclosed which eliminates the individual and/or separate handling of matchplates and flasks as has been heretofore involved in the prior art.

Although this invention has been described in its preferred form and preferred practice, with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. The method of making foundry molds including the steps of selecting a cope and first drag flask both filled with compacted sand with a matchplate therebetween and locating same at a first station, selecting a second drag flask filled with compacted sand and locating same at a second station adjacent said first station, removing said cope flask with compacted sand therein from said first drag flask and matchplate and placing same on said second drag flask which has compacted sand therein to form a finished mold, removing said finished mold therefrom, moving said empty cope flask back into position on said matchplate located on said first drag flask, separating said cope flask and matchplate as a unit from said first drag flask, moving said first drag flask which has compacted sand therein to said second station and moving said empty second drag flask to said first station beneath said empty cope flask and matchplate, placing said cope flask and matchplate into position onto said second drag flask, transferring said assembled empty cope flask, matchplate and second empty drag flask to a molding area where the same are filled with sand and which is compacted and thereafter moving same back to said first station, and repeating the aforementioned method by starting with said cope flask filled with compacted sand, matchplate and second drag flask filled with compacted sand in said first station and said first drag flask filled with compacted sand in said second station.

2. The method of making foundry molds including the steps of selecting a cope and first drag flask both filled with squeezed sand with a matchplate therebetween and locating same at a first station, selecting a second drag flask filled with compacted sand and locating same at a second station adjacent said first station, lifting said cope flask with squeezed sand therein from said first drag flask and matchplate and lowering the same onto said second drag flask which has squeezed sand therein to form a finished mold, releasing the sand locks on said cope flask and second drag flask and lowering said finished mold therefrom and then closing the released sand locks, lifting said empty cope flask and then lowering the same back into position on said matchplate located on said first drag flask, lifting said empty cope flask and matchplate as a unit from said first drag flask, moving said first drag flask which has squeezed sand therein laterally to said second station and moving said empty second drag flask to said first station beneath said empty cope flask and matchplate, lowering said cope flask and matchplate into position onto said second drag flask, transferring said assembled empty cope flask, matchplate and second empty drag flask to a molding area where the same are filled with sand and squeezed and thereafter moving same back to said first station, and repeating the aforementioned method by starting with said cope flask filled with squeezed sand, matchplate and second drag flask filled with squeezed sand in said first station and said first drag flask filled with squeezed sand in said second station.

3. The method of making foundry molds including the steps of selecting a first cope and first drag flask both filled with compacted sand with a matchplate therebetween and locating same at a first station, selecting a second drag flask filled with compacted sand and locating same at a second station adjacent said first station, selecting an empty second cope and empty third drag flask and locating same at a third station, removing said first cope flask with compacted sand therein from said first drag flask and matchplate and placing same on said second drag flask which has compacted sand therein to form a finished mold, removing said finished mold from said second station, moving said empty second cope flask into position on said matchplate located on said first drag flask, separating said second cope flask and matchplate as a unit from said first drag flask, moving said first drag flask which has compacted sand therein to said second station and moving said empty third drag flask to said first station beneath said empty second cope flask and matchplate, placing said second cope flask and matchplate into position onto said third drag flask, transferring said assembled empty second cope flask, matchplate and third empty drag flask to a molding area where the same are filled with sand and compacted and thereafter moving same back to said first station, and repeating the aforementioned method by starting with said second cope flask filled with compacted sand, matchplate and third drag flask filled with compacted sand in said first station and said first drag flask filled with compacted sand in said second station and another empty cope and empty drag flask located at said third station.

4. The method of making foundry molds including the steps of selecting a first cope and first drag flask both filled with squeezed sand with a matchplate therebetween and locating same at a first station, selecting a second drag flask filled with compacted sand and locating same at a second station adjacent said first station, selecting an empty second cope and empty third drag flask and locating same at a third station, lifting said first cope flask with squeezed sand therein from said first drag flask and matchplate and lowering the same onto said second drag flask which has squeezed sand therein to form a finished mold, lowering said finished mold from said second station, lifting said empty second cope flask and then lowering the same into position on said matchplate located on said first drag flask, lifting said empty second cope flask and matchplate as a unit from said first drag flask, moving said first drag flask which has squeezed sand therein laterally to said second station and moving said empty third drag flask to said first station beneath said empty second cope flask and matchplate, lowering said second cope flask and matchplate into position onto said third drag flask, transferring said assembled empty second cope flask, matchplate and third empty drag flask to a molding area where the same are filled with sand and squeezed and thereafter moving same back to said first station and repeating the aforementioned method by starting with said second cope flask filled with squeezed sand, matchplate and third drag flask filled with squeezed sand at said first station and said first drag flask filled with squeezed sand at said second station and another empty cope and empty drag flask located at said third station.

5. The method of making foundry molds including the steps of selecting a cope and first drag flask both filled with compacted sand with a matchplate therebetween and locating same at a first station, selecting a second drag flask filled with compacted sand and locating same at a second station adjacent said first station, removing said cope flask with compacted sand therein from said first drag flask and matchplate and placing same on said second drag flask which has compacted sand therein to form a closed mold, moving an empty cope flask into position on said matchplate located on said first drag flask, separating said empty cope flask and matchplate as a unit from said first drag flask, moving said first drag flask which has compacted sand therein to said second station, moving an empty drag flask to said first station beneath said empty cope flask and matchplate, placing said empty cope flask and matchplate into position onto said empty drag flask, transferring said assembled empty cope flask, matchplate and said empty drag flask to a molding area where the same are filled with sand and which is compacted and thereafter moving same back to said first station, and repeating the aforementioned method by starting with said empty cope flask filled with compacted sand, matchplate and said empty drag flask filled with compacted sand at said first station and said first drag flask filled with compacted sand at said second station.

References Cited
UNITED STATES PATENTS

| | | | |
|---|---|---|---|
| 1,561,500 | 11/1925 | Wood | 164—182 X |
| 2,012,478 | 8/1935 | Oyster et al. | |
| 3,229,336 | 1/1966 | Hunter et al. | 164—182 X |
| 3,406,738 | 10/1968 | Hunter | 164—183 X |

J. SPENCER OVERHOLSER, Primary Examiner

J. E. ROETHEL, Assistant Examiner

U.S. Cl. X.R.

164—182, 183, 187, 341, 137